US00RE35039E

United States Patent [19]

Masuda et al.

[11] E Patent Number: Re. 35,039

[45] Reissued Date of Patent: Sep. 26, 1995

[54] METHOD OF MANUFACTURING A JACK

[75] Inventors: Toru Masuda; Yasuji Shibano, both of Osaka, Japan

[73] Assignee: Hosiden Electronics Co., Ltd., Yao, Japan

[21] Appl. No.: 278,239

[22] Filed: Nov. 30, 1988

Related U.S. Patent Documents

Reissue of:

[64] Patent No.: 4,685,212
Issued: Aug. 11, 1987
Appl. No.: 774,619
Filed: Sep. 10, 1985

[30] Foreign Application Priority Data

Sep. 29, 1984 [JP] Japan ..... 59-205153

[51] Int. Cl.[6] ..... H01R 43/00

[52] U.S. Cl. ..... 29/876; 29/882; 29/414

[58] Field of Search ..... 29/414, 874, 876, 29/557, 882

[56] References Cited

U.S. PATENT DOCUMENTS 4,546,542 10/1985 Proud ..... 29/874

*Primary Examiner*—Timothy V. Eley
*Attorney, Agent, or Firm*—Jones, Tullar & Cooper

[57] ABSTRACT

The invention relates to a method of manufacturing a jack comprising a step of punching a sheet metal by which a plurality of contact piece elements to be individual contact pieces of a jack are formed into a state of being partially connected to one another and arranged in parallel, a step of bending both ends of each contact piece element downward, a step of cutting off each contact piece element arranged in parallel by a cutter to form individual contact pieces, and a step of forcedly incorporating each contact piece into a jack body positioned right under a punching stroke of the cutter positioned right under a punching stroke of the cutter used in the cutting step whereby a complete automatization of the manufacturing is attained, considerably increasing productivity and decreasing an equipment cost as much.

22 Claims, 4 Drawing Sheets

METHOD OF MANUFACTURING A JACK

Matter enclosed in heavy brackets [ ] appears in the original patent but forms no part of this reissue specification; matter printed in italics indicates the additions made by reissue.

BACKGROUND OF THE INVENTION

This invention relates to a method of manufacturing a jack.

Hitherto, a jack is conventionally manufactured by a process comprising a step of forming an electro-conductive metal sheet conveyed in one direction into multiple contact pieces by using a progressive press and a die, a step of mounting a specified number of these contact pieces on an automatic assembly machine, a step of setting a jack body to a predetermined position, and a step of incorporating each contact piece into the jack body by operating an automatic assembly machine.

In such a conventional manufacturing method, however, a serious problem exists in that it is necessary to be equipped with the automatic assembly machine which is several times more expensive than the die by, thereby considerably increasing the overall equipment cost. Moreover, since it is required to mount a fixed number of contact pieces which have undergone a complicated pressing step and a bending step on the automatic assembly machine, the working process as a whole requires much time and labor. Such being the situation, it has been difficult to automatize completely the manufacturing method, which is another problem.

SUMMARY OF THE INVENTION

In view of the foregoing situation, it is an object of this invention to provide a novel method of manufacturing a jack by which a complete automatization is easily attained, considerably improving productivity and saving facility cost.

The foregoing object is accomplished by a method of manufacturing a jack comprising a step of punching a sheet metal by which a plurality of contact piece elements to be individual contact pieces of a jack are formed into a state of being partially connected to one another and arranged parallel to one another, a step of bending both ends of each contact piece element downward, a step of cutting off each contact piece element arranged in parallel by a cutter so that each forms an individual contact piece, and a step of forcedly incorporating each contact piece into a jack body positioned beneath the strip of sheet metal at a punching stroke of the cutter used in the cutting step.

Other features and advantages of this invention will become apparent in the course of the following description of the preferred embodiments with the accompanying drawings.

BRIEF DESCRIPTION OF THE DRAWINGS

In the drawings forming a part of this application, and which shows a novel method of manufacturing a jack in accordance with this invention (i.e., a best method for embodying the principle of this invention)

DETAILED DESCRIPTION OF THE PREFERRED EMBODIMENTS

One of the preferred embodiments of this invention is illustratively shown in the accompanying drawings, i.e., FIG. 1 through FIG. 9.

Figure 1:
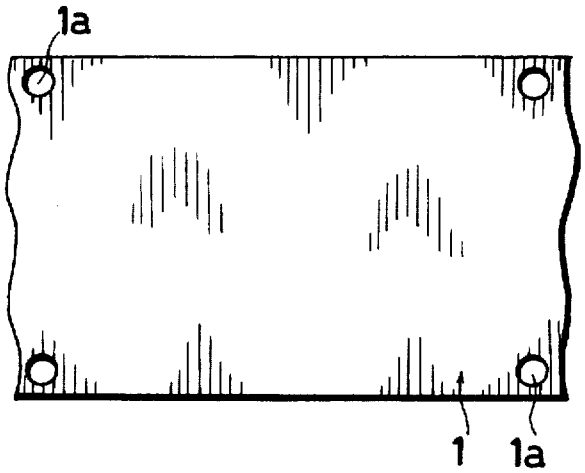
FIG. 1 is a plan view of a part of an elongated electro-conductive sheet metal.
Figure 2:
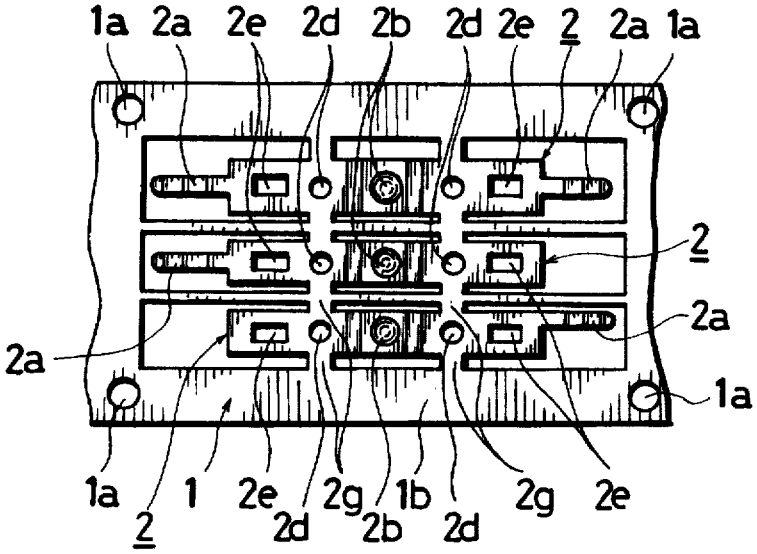
FIG. 2 is a plan view wherein the sheet metal is punched and formed into a plurality of contact piece elements arranged in parallel and in a direction orthogonal to a conveying direction of the sheet metal.

FIG. 1 shows a part of an electro-conductive elongated sheet metal and 1 which is used as a material in forming contacts pieces of a jack, and on which positioning holes 1a are formed at a specified distance on both edges of the longitudinal sides. FIG. 2 shows a state wherein a plurality of contact piece elements 2, to finally form the individual contact pieces of the jack, are formed in a direction orthogonal to a conveying direction of the sheet metal 1 and parallel to each other by punching sheet metal 1. These contact piece elements 2 are connected with a remaining outer frame of the metal sheet 1 through connecting pieces 2g, and the contact piece elements 2,2 adjacent each other are also connected mutually through the connecting pieces 2g. A lead 2a for connecting to a printed-wiring board by soldering or the like is integrally formed at the edge of each contact piece element 2. Before or after the punching step, a contacting point 2b bulging or being enlarged downward is formed at the center of each contact piece element 2. Furthermore, before the punching step or at the time of punching, circular positioning holes 2d are formed between the middle part and both ends of each contact piece element 2, and in addition rectangularly punched holes 2e are formed at positions near their outside, i.e., at both ends of each contact piece element 2.

Figure 3:
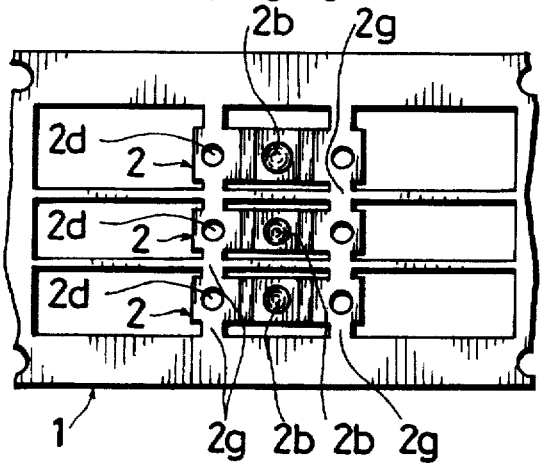
FIG. 3 is a plan view wherein both ends of each contact piece element arranged in parallel are bent downward.

FIG. 3 shows a bending step wherein each contact piece element 2 formed into the state of FIG. 2 is bent downward making a right angle at tile middle parts between tire circular positioning holes 2d and the rectangularly punched holes 2e.

Figure 4:
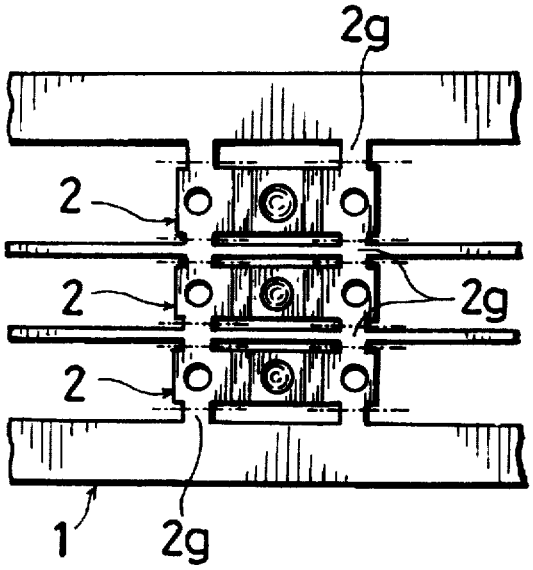
FIG. 4 is a plan view showing a cutting portion by dot-dash line when cutting off each contact piece element partially connected to one another.
Figure 5:
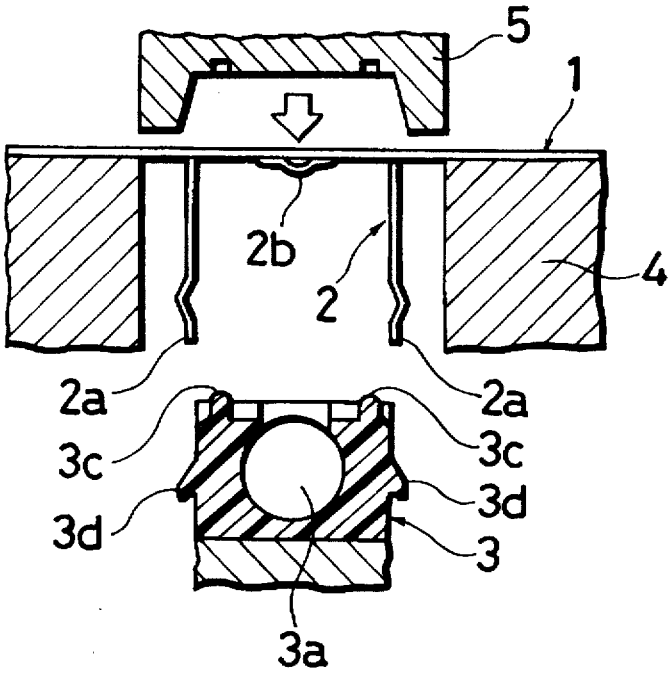
FIG. 5 is a front view showing a positional relationship among each contact piece element, a punch of a cutter and a jack body when cutting each contact piece element by the cutter and forcedly incorporating into the jack body.
Figure 6:
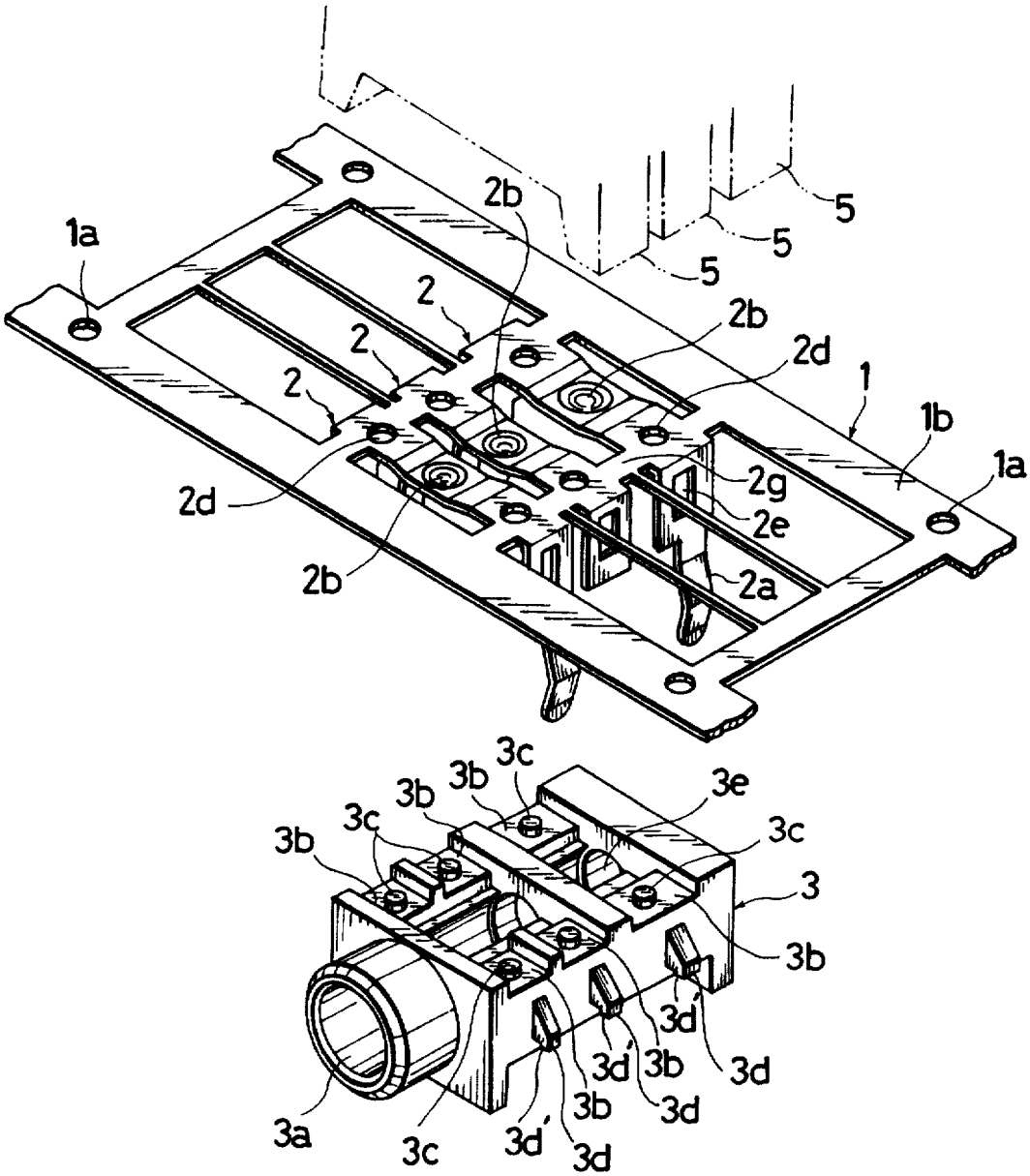
FIG. 6 is a perspective view showing a positional relationship between each contact piece element and the jack body when cutting off each contact piece element and forcedly incorporating into the jack body.
Figure 7:
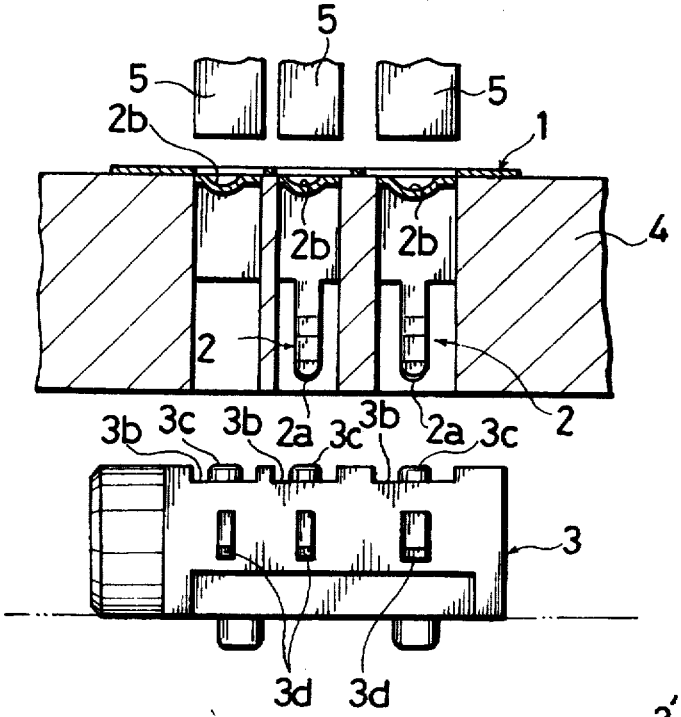
FIG. 7 is a side view showing the positional relationship among each contact piece element, the punch of the cutter and the jack body.

FIGS. 4 and 5 show a cutting step wherein each contact piece element 2 is cut off by a punch 5 of a cutter at the portions indicated by the dot dash line in FIG. 4.

Meanwhile, a jack body 3 is composed of an insulating material such as synthetic resin, and at the center thereof a plug insertion hole 3a running through from the front side to the rear side is formed. Further, on the outside of both side walls being in parallel with said plug insertion hole 3a, projections 3d, for retention are formed, the projections 3d being engaged with the punched holes 2e of each contact piece element 2. The projections 3d are so formed that each upper side thereof is gradually inclined downward, and a projecting piece 3d' projecting downward is formed at the end of the of bottom of each projection 3d. Furthermore, in order to individually insert and hold the middle part of each contact piece element 2, grooves 3b adapted to the width of the middle part are formed on both sides of the upper part of the body 3, and at the upper side of each groove 3b, a positioning projection 3c is formed for engaging with the positioning hole 2d of each contact piece element 2 from above. In addition, at the center part of the body 3, openings 3e are formed so as to communicate with the plug insertion hole 3a.

Figure 8:
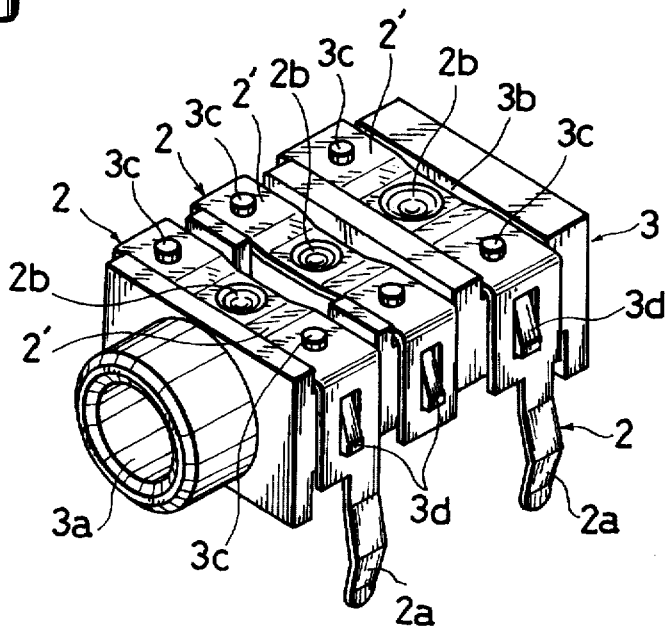
FIG. 8 is a perspective view of a jack manufactured by a method according to this invention.
Figure 9:
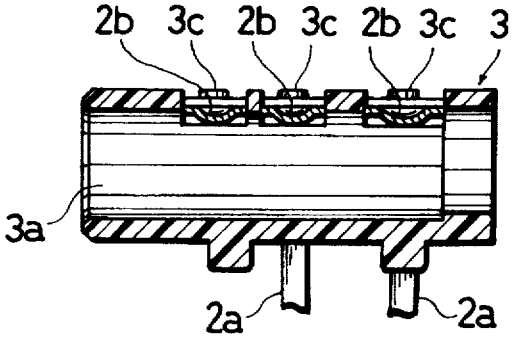
FIG. 9 is a sectional view of the jack in FIG. 8.

Then, the jack body 3 is placed right under each contact piece element 2 formed into the state of FIG. 4, as shown in FIG. 5. By lowering the punch 5 of the cutter from above the sheet metal 1 toward a female form 4 in which an opening permitting each contact piece in the mentioned state to be inserted is formed, every connecting piece 2g is cut off thus separating the connection among the plurality of contact piece elements 2. By further lowering the punch 5 extending the stroke thereof, each cut away contact piece element 2 is forcedly incorporated into the jack body 3 located thereunder. In this step, the end of each contact piece element 2 which is bent downward making a right angle is diverged outwardly along a tapered face of the projection 3d, then the rectangularly punched hole 2e is engaged with an inside of the projecting piece 3d' of the projection 3d by returning inwardly due to the elasticity of the material, and at the same time the circular positioning holes 2d are respectively engaged with the positioning projections 3c. In this manner, each contact piece element 2 can be forcedly incorporated into the jack body 3 while keeping an exact relative position and in such a manner to prevent release. Also in this step, as shown in FIG. 8, since the upper openings of the body 3 are covered with intermediate horizontal plates 2' having the contacting points 2b located thereon, entrance of dust from above is completely prevented, while a contact state with a plug (not illustrated) is ensured by protruding the contacting points 2b into the plug insertion hole 3a.

Accordingly, when using the manufacturing method of a jack as described above, an expensive automatic assembly machine is not required at all, automatization being easily attained, and moreover cost of dies, working cost, working time, etc. are saved.

Thus, in the case of the foregoing embodiment, plural contact piece elements 2 are formed by punching so as to be orthogonal to the conveying direction of the sheet metal and arranged in parallel to one another, and when each contact piece element 2 is cut off respectively to be forcedly incorporated into the jack body 3, the jack body 3 is conveyed from the direction orthogonal to the conveying direction of the sheet metal so as to be positioned right under each contact piece element 2 to be separated by cutting.

This invention, however, is not limited to the foregoing embodiment but enables a further embodiment wherein the plural contact pieces are formed by punching in the same direction as the conveying direction of the sheet metal, and when cutting each contact piece element to be incorporated forcedly into the jack body, the jack body 3 is conveyed from the same direction as the conveying direction of the sheet metal so as to be positioned right under each contact piece element to be separated by cutting.

As this invention may be embodied in several forms without departing from the spirit of the essential characteristics thereof, the foregoing embodiments are therefore illustrative and not restrictive, since the scope of this invention is defined by the appended claims rather than by the preceding description, and all changes that fall within meets and bounds of the claims, or equivalence of such meets and bounds are therefore intended to be embraced by the claims.

What is claimed is:

1. A method of manufacturing a jack having a jack body including a plug insertion hole, side walls extending parallel thereto and a top side between the side walls, and a plurality of contact piece elements, comprising the steps of:

punching a strip of elastic, conductive sheet metal thereby forming a plurality of elastic contact piece elements which extend parallel to each other, form partial connections along their parallel extent and each have two ends;

bending both ends of each contact piece element downward;

positioning the jack body beneath the strip of sheet metal;

severing the contact piece elements at their partial connections thereby forming the plurality of contact piece elements into individual unconnected contact pieces; and forcedly incorporating each individual piece into engagement with the jack body.

2. The method as defined in claim 1, further comprising the steps of:

forming at least one positioning hole on each contact piece element; and forming a positioning projection of the top side of the jack body between the side walls, for each positioning hole, wherein:

each positioning projection engages its respective positioning hole when the individual contact pieces are forcedly incorporated into engagement with the jack body.

3. The method as defined in claim 2, further wherein:

the positioning holes are formed during punching.

4. The method as defined in claim 1, further comprising the steps of:

forming a plurality of projections on each side wall of the jack body, wherein:

a hole is punched in each contact piece element at each end thereof, which holes are situated parallel to each other at the respective ends of the contact piece elements; and each hole engages a respective projection when the contact pieces are forcedly incorporated into engagement with the jack body to thereby retain the individual contact pieces in engagement with the jack body.

5. The method as defined in claim 4, further wherein:

the holes are formed during punching.

6. The method as defined in claim 4, further wherein:

the holes are formed as rectangular holes.

7. The method as defined in claim 4, further comprising the steps of:

forming at least one positioning hole on each contact piece element; and forming a positioning projection on the top side of the jack body between the side walls, for each positioning hole, wherein:

each positioning projection engages its respective positioning hole when the individual contact pieces are forcedly incorporated with the jack body.

8. The method as defined in claim 7, further wherein: the positioning holes are formed during punching.

9. The method as defined in claim 4, further wherein: the plurality of projections are each formed with a downwardly tapered surface and a downwardly projecting piece extending from the projection at the bottom end of its tapered surface; and the ends of each individual contact piece first engages the downwardly tapered surface of a respective projection when the individual contact pieces are forcedly incorporated into engagement with the jack body and forced outwardly, and thereafter engage the projecting piece of the respective projection thereby being situated between the projecting piece and a side wall of the jack body.

10. The method as defined in claim 9, further comprising the steps of:

forming at least one positioning hole on each contact piece element; and forming a positioning projection on the top side of the jack body between the side walls for each positioning hole, wherein:

each positioning projection engages its respective positioning hole when the individual contact pieces are forcedly incorporated into engagement with the jack body.

11. The method as defined in claim 10, further wherein:

the positioning holes are formed during punching.

12. The method as defined in claim 1, further comprising the steps of:

forming an opening on the topside of the jack body, between the side wails, communicating with the plug insertion hole; and forming a contacting point on each contact piece element, wherein:

the contacting points extend into the opening on the top side of the body, and consequently into the plug insertion hole when the individual contact pieces are forcedly incorporated into engagement with the jack body.

13. The method as defined in claim 12, further wherein:

the contact points are formed on the center of each contact piece element before the contact piece elements are severed at their partial connections.

14. The method as defined in claim 12, further comprising the steps of:

forming at least one positioning hole on each contact piece element; and forming a positioning projection on the top side of the Jack body between the side walls, for each position hole, wherein:

each positioning projection engages its respective positioning hole when the individual contact pieces are forcedly incorporated into the engagement with the jack body.

15. The method as defined in claim 14, further wherein:

the positioning holes are formed during punching.

16. The method as defined in claim 1, wherein: the plurality of contact piece elements are formed to extend parallel to each other in a direction orthogonal to a conveying direction of the sheet metal; and the jack body is positioned beneath the strip of sheet metal by conveying it in a direction orthogonal to the conveying direction of the sheet metal.

17. The method as defined in claim 1, wherein:

the plurality of contact piece elements are formed to extend parallel to each other in a direction parallel to a conveying direction of the sheet metal; and the jack body is positioned beneath the strip of sheet metal by conveying it in a direction parallel to the conveying direction of the sheet metal.

*18. A method of manufacturing a jack having a jack body and plural elastic contact piece elements, comprising the steps of:*

*forming the plural elastic contact piece elements by blanking a strip of conductive sheet metal having a middle portion and two end portions in the longitudinal direction thereof, forming contact part in the middle portion in the longitudinal direction thereof, and bending both end portions in the longitudinal direction downward to form side pieces;*

*forming the jack body from an insulating material having a plug insertion hole, side walls extending parallel thereto, a top surface between said side walls, and an opening communicating with said plug insertion hole in said top surface; and*

*assembling by mutually engaging both side pieces of said elastic contact piece elements and both side walls of said jack body so that the contact part of said elastic contact piece elements may be projected out into the plug insertion hole from the opening of said jack body.*

*19. The method as defined in claim 18, wherein the jack body is disposed beneath the plural elastic contact piece elements so that the top surface of the jack body and the plural elastic contact piece elements may confront each other, and both side pieces of said elastic contact piece elements and both side walls of said jack body are engaged with each other so that the contact point of each elastic contact piece element may be projected out into the plug insertion hole from the opening of said jack body.*

*20. The method as defined in claim 18, further comprising the step of forming protrusions on the outer surface of both side walls of the jack body; and forming holes in both side pieces of said elastic contact piece elements, said protrusions being engaged with these holes.*

*21. The method as defined in claim 18, further comprising the step of forming a protrusion on the top surface of the jack body, and forming a hole in a coupling piece for joining both side pieces of said elastic contact piece elements, wherein the hole in the coupling piece of said elastic contact piece elements is engaged with the protrusion on the top surface of said jack body in the step of engagement of both side pieces of said elastic contact piece elements and both side walls of said jack body.*

*22. The method as defined in claim 21, wherein the protrusion of the top surface of the jack body projecting from the hole is settled in the coupling piece of the elastic contact piece elements by engaging the hole of the coupling piece of the elastic contact piece elements with the protrusion on the top surface of the jack body.*

* * * * *

UNITED STATES PATENT AND TRADEMARK OFFICE

CERTIFICATE OF CORRECTION

PATENT NO. : Re. 35,039

DATED : September 26, 1995

INVENTOR(S) : Toru Masuda et al

It is certified that error appears in the above-indentified patent and that said Letters Patent is hereby corrected as shown below:

Claim 12, column 5, line 34, "topside" should be "top side"; and line 35, "wails" should be "walls".

Claim 14, column 5, line 53, "Jack" should be "jack".

Claim 18, column 6, line 19, "a" should be inserted between "forming" and "contact".

Signed and Sealed this

Second Day of January, 1996

Bruce Lehman

*Attest:*

BRUCE LEHMAN

*Attesting Officer*

*Commissioner of Patents and Trademarks*